US006564637B1

United States Patent
Schalk et al.

(10) Patent No.: US 6,564,637 B1
(45) Date of Patent: May 20, 2003

(54) SENSOR HAVING A RESONANCE STRUCTURE, ESPECIALLY AN ACCELERATION OR ROTATION RATE SENSOR, AND A DEVICE FOR CARRYING OUT A SELF-TEST

(75) Inventors: Josef Schalk, Altheim (DE); Erwin Stenzel, Deisenhofen (DE); Karin Bauer, Oberhaching (DE); Rainer Freitag, Owen (DE); Roland Hilser, Kirchheim (DE); Ralf Voss, Münsing (DE); Matthias Aikele, München (DE); Helmut Seidel, Starnberg (DE); Ulrich Prechtel, München (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/806,404

(22) PCT Filed: Oct. 1, 1999

(86) PCT No.: PCT/DE99/03163

§ 371 (c)(1),
(2), (4) Date: May 15, 2001

(87) PCT Pub. No.: WO00/20826

PCT Pub. Date: Apr. 13, 2000

(30) Foreign Application Priority Data

Oct. 1, 1998 (DE) .......................................... 198 45 185

(51) Int. Cl.⁷ ............................ G01P 9/04; G01P 21/00; G01P 15/00
(52) U.S. Cl. ............................... 73/504.12; 73/514.29; 73/1.38
(58) Field of Search .................................. 73/1.37, 1.38, 73/514.29, 514.33, 514.34, 514.01, 514.17, 504.12, 504.15, 504.16, 504.13, 504.14; 310/370

(56) References Cited

U.S. PATENT DOCUMENTS

| | | |
|---|---|---|
| 5,060,504 A | 10/1991 | White et al. |
| 5,103,667 A | 4/1992 | Allen et al. |
| 5,377,523 A * | 1/1995 | Ohta et al. ..................... 73/1.38 |
| 5,834,646 A | 11/1998 | Kvisterøy et al. |

FOREIGN PATENT DOCUMENTS

| | | |
|---|---|---|
| DE | 38 09 299 | 3/1990 |
| DE | 195 28 961 | 10/1998 |
| DE | 198 53 063 | 5/1999 |
| DE | 198 12 773 | 9/1999 |
| EP | 0 525 549 | 2/1993 |
| EP | 0 638 782 | 2/1995 |
| EP | 0 708 925 | 6/1998 |
| JP | 7-181042 | 7/1995 |

OTHER PUBLICATIONS

C. Lemaire, et al., "Surface Micromachined Sensors for Vehicle Navigation Systems", *Advanced Microsystems for Automotive Applications 98*, D.E. Ricken and W. Gessner, editors, Springer, Berlin 1998, pp. 103–112.

* cited by examiner

*Primary Examiner*—Helen Kwok
(74) *Attorney, Agent, or Firm*—Kenyon & Kenyon (57) ABSTRACT

A self-testing sensor (especially to measure an angular rate or acceleration) includes a resonant structure, an actor unit configured to excite the structure to a first periodic vibration, a piezoresistive element configured to generate an output signal that depends on the measured quantity, and an isolator configured to isolate a test signal component from the output signal, whereby the test signal component is generated by a second periodic vibration of the structure superposed on the first vibration. A device for self-testing a sensor includes an isolator configured to isolate a test signal component superposed on a useful signal component from the periodic output signal of the sensor, and it includes a comparator configured to compare the test signal component with a predefined value or a test signal fed to the sensor. For the self-test, a second periodic vibration is superposed on a first vibration of the structure, and an output signal containing information on the measured quantity is determined. A test signal component contained in the output signal is monitored.

27 Claims, 6 Drawing Sheets

SENSOR HAVING A RESONANCE STRUCTURE, ESPECIALLY AN ACCELERATION OR ROTATION RATE SENSOR, AND A DEVICE FOR CARRYING OUT A SELF-TEST

FIELD OF THE INVENTION

The present invention relates to a sensor and a device and method for a sensor self-test. Furthermore, the invention relates to an acceleration sensor.

BACKGROUND INFORMATION

In general, sensors are used in systems to detect measured quantities. In the field of inertial sensors, angular rate sensors and acceleration sensors are, for example, used to determine quantities of motion. Since these applications usually influence safety, the sensors must be extremely reliable and securely determine measured quantities.

German Published Patent Application No. 195 28 961 describes an angular rate sensor based on the tuning fork principle that is made of silicon. During operation, the tuning forks are excited to vibrate, and a sensor element registers the torsion of the tuning fork suspension that arises when the sensor rotates around an axis parallel to the tuning fork suspension.

To recognize sensor disturbance or drift, the sensor must undergo tests during operation. This increases the reliability and precision of the determined measured quantities.

European Published Patent Application No. 0708 925 describes a device to recognize errors in an impact sensor system in which a test reaction is generated when a sensor element is actuated, and the results are compared with the results of an expected reaction. U.S. Pat. No. 5,060,504 describes a method for the self-calibration of an acceleration sensor where a sensor mass is moved relative to a frame, and the movement corresponds to known acceleration. The initial value is used as a reference value for subsequent calibration. In the self-testing acceleration sensor described in U.S. Pat. No. 5,103,667, a mass is moved in a specific manner to test or calibrate the sensor, and the movement is measured.

These systems have the disadvantage, however, that the actual measuring must be interrupted during the sensor test. Measuring and testing alternate, and the measuring signal is not continuous over time. Furthermore, only a specific, predefined measured quantity is generated for the comparison, i.e., the overall measuring range of the sensor is not tested.

Acceleration sensors are, for example, used in vehicles to control the chassis and for navigational systems, handling dynamic systems, and passive safety systems (air bags). The continuously increasing number of sensors makes reliability a maximum priority. In the future, an increasing number of systems will actively influence driving, and rigid mechanical couplings will be replaced by electronic signals (drive-by-wire). A suitable signal control or the ability of sensors to test themselves is essential. Furthermore, acceleration sensors are being increasingly used in navigation systems for civil and military air travel.

Particularly in automobiles, capacitive acceleration sensors are frequently used as, for example, described by C. Lemaire and B. Sulouff in the article: "Surface Micromachined Sensors for Vehicle Navigation Systems in Advanced Microsystems for Automotive Applications (D. E. Ricken and W. Gessner, editors, Springer, Berlin 1998, p. 103–112). These systems can also use the electrodes for capacitive readout to displace mass. This can be done at discrete intervals, but not continuously.

U.S. Pat. No. 5,834,646 describes a resonant acceleration sensor that essentially consists of a plate clamped several times. The plate serves as a resonator whose resonance frequency is disturbed from external acceleration, as well as a seismic mass. This arrangement can test the integrity of the mass/spring system, but cannot simulate the effect of acceleration.

Another resonant acceleration sensor is described in German Published Patent Application No. 198 12 773. It has a resonator structure that is excited to vibrate by initial electrical signals, and it emits secondary electrical signals depending on the measured quantity.

A permanent self-test has not been possible for the abovecited capacitive sensors as well. It is, however, possible to use additional structures such as additional capacitor combs to provide excitation, but they would require more space and cost more. Conventional capacitive sensors can therefore at most only run a static self-test at discrete intervals.

There is a need for a sensor, especially a rate of rotation or acceleration sensor with a precise, resonant signal evaluation that can run a permanent or ongoing self-test.

It is therefore one object of the present invention to provide a sensor and a device and method for a sensor self-test in which measurement is uninterrupted during the test and the measuring signal is not impaired, and the self-test can run continuously during measuring.

SUMMARY

The above and other beneficial objects of the present invention are achieved by providing a sensor, a sensor self-testing device, a method for sensor self-testing and an acceleration sensor as described herein.

The sensor according to the invention includes a resonant structure to detect a measured quantity, an actor unit to excite the structure to cause an initial, periodic oscillation, an element to generate an output signal that depends on the measured quantity, and one of a detector and an isolator respectively configured to detect and isolate the test signal from the output signal that is generated by a second periodic vibration of the structure that is superposed on the first vibration. The sensor can test itself and is able to simultaneously provide a continuous measuring signal and a test signal that provides information on the functioning of the sensor. The measurement is not interrupted, and the measuring signal is not impaired.

The sensor may also include elements configured to generate the second periodic vibration of the structure, and the first and second periodic vibration may be generated, e.g., by the same actor elements. The second vibration may also be generated by mechanical crosstalk. In operation, the vibrations of the structure are detected to generate the output signal.

According to another aspect of the present invention, a device is provided for sensor self-testing, and the sensor determines a measured quantity via a resonant structure and generates a periodic output signal depending on the measured quantity. The self-testing device includes an isolator configured to isolate a test signal component superposed on a useful signal component from the periodic output signal of the sensor and may also include a comparator configured to compare the test signal component with a predefined value or with a test signal fed to the sensor. A sensor self-test may be performed with a device that is continuous and may cover the entire measuring and dynamic range of the sensor without influencing the actual measuring.

The sensor or device may include a device configured to modulate a test signal on a signal for exciting the resonant structure. This arrangement allows the self-test to be adjusted over the entire measuring range of the sensor.

The sensor may include a mechanical unbalance or crosstalk that generates the test signal component which is used to test the sensor. This arrangement reduces the number of components and permits economical manufacture. The sensor may include an actor element configured to generate the second vibration that causes the test signal component, and the device may include an exciting device configured to excite the structure to a second vibration mode that is superposed on a first vibration mode which serves to detect the measured quantity. This arrangement allows specific test signals to be modulated onto the useful signal, and the sensor output signal may be evaluated according to the measured quantity and response of the system to the test signal.

The output signal may be analyzed by a device configured for frequency and/or phase analysis. The test may cover the entire measuring and/or dynamic range of the sensor using an arrangement configured to periodically change the amplitude and/or frequency of the test signal. In particular, the sensor may be an angular rate sensor, acceleration sensor or pressure sensor.

The sensor according to the invention may include, e.g., a resonator as the resonant structure and a linked resonant mass that changes that the resonance frequency of the resonator when it is displaced. The mass may be caused to vibrate during measurement to generate the test signal component.

The test signal component may be used to calibrate the sensor.

During operation, the actor unit, e.g., may vibrate a resonator and a linked mass in different modes, whereby the resonant mass periodically changes the resonance frequency of the resonator to generate the test signal component.

The sensor, e.g., may include a demodulator configured to demodulate the measuring signal, whereby the signal may be amplitude modulated or frequency modulated.

The method according to the invention for self-testing a sensor with a resonant structure includes the steps of: superposing second periodic vibration on a first vibration of the structure that is used to detect a measured quantity; determining an output signal that contains information on the measured quantity linked to the resonant structure; and monitoring a test signal component contained in the output signal that is generated by the second periodic vibration of the structure.

The amplitude of an excitation signal may be modulated by a test signal to generate the first vibration of the structure, and the frequency and/or amplitude of the test signal may be varied while the sensor is measured. In the method according to the invention, the entire functioning of the sensor including its electronics may be verified over its entire dynamic range. The method according to the present invention greatly increases the intrinsic safety of the sensor, which is particularly important for applications that influence safety.

The frequency of the excitation signal may also be modulated by a test signal to perform the self-test during measurement.

The test signal component in the output signal may be used to calibrate the sensor. The structure may be excited to vibrate at a minimum of two frequencies or modes. The first frequency or mode may represent the quantity to be measured, and a second frequency or mode may represent a test signal.

The acceleration sensor according to the present invention includes a resonator coupled to a mass so that its resonance frequency changes when the mass is displaced, an actor unit configured to excite the resonator, a detector configured to generate an output signal that depends on the resonance frequency, a control unit configured to generate an excitation signal that includes at least two frequencies to simultaneously excite the resonator and mass, and an evaluation step that separates from the output signal the vibration mode of the mass as a test signal component.

The sensor according to the present invention allows all relevant components of the evaluation electronics to be tested during the self-test. Recalibration may also be performed at set intervals.

DETAILED DESCRIPTION

Figure 1:
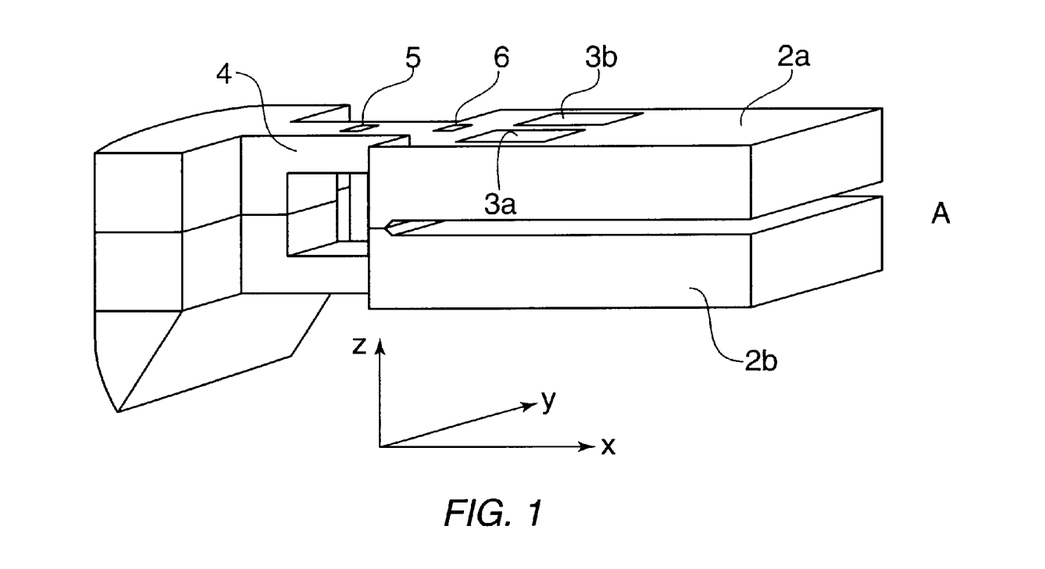
FIG. 1 is a perspective view of an example embodiment of a micromechanical angular rate sensor according to the present invention.

The sensor 1 shown in FIG. 1 is an angular rate sensor that operates according to the tuning fork principle and is made of silicon. Two parallel prongs 2a, 2b form a resonant structure that serves to detect the angular rate. On the top prong 2a is a dual electrode 3a, 3b that, among other things, is used to excite the prongs 2a, 2b to periodic vibration in the Z direction. The tuning fork suspension 4 is designed as a torsion bar to which is attached a piezoresistive element 5. The piezoresistive element 5 serves to generate an output signal that is created when the tuning fork suspension 4 experiences torsion. The torsion is periodically generated from the Coriolis force when the angular rate sensor rotates around the X-axis running through the tuning fork suspension while the prongs 2a, 2b vibrate in the Z direction. The piezoresistive element 5 together with a down-stream electronic unit also serve to detect and isolate a test signal component from the output signal that is generated by another periodic vibration of the prongs.

The other periodic vibration superposed on the first vibration may, e.g., arise from an unbalance in the sensor 1, e.g., due to asymmetry of the vibrating masses. In this case, the sensor 1 is subjected to mechanical crosstalk, the signal component of which in the output signal is superposed on the actual useful signal or angular rate signal, and is used as a test signal.

On the other hand, the prongs 2a, 2b may also be excited by the dual electrode 3a, 3b to a different vibration or torsional vibration that is superposed on the excitation vibration in the Z direction and that produces the test signal component in the output signal. Close to the torsion bar 4 is another piezoresistive element 6 on the top prong 2a that monitors the prong vibration in the Z direction or monitors the amplitude of this vibration.

While measuring, the prongs 2a, 2b vibrate in phase opposition in the Z direction. When the system rotates around the X-axis, torsion vibration is registered by the piezoresistive element on the torsion bar that is phase-shifted 90° from the prong amplitude. Due to the manufacturing tolerances or intentional asymmetry, another measuring signal is generated by the piezoresistive element 5 that is independent of the angular rate, and is phase-shifted 90° from the actual measuring signal or angular rate signal with sensors that have sufficient distance between the intrinsic frequency of the torsion and the intrinsic frequency of the excitation. This signal component that is generated by the mechanical crosstalk is used in an example embodiment of the present invention as a test signal component and evaluated in the sensor self-test.

Since the test signal component is phase-shifted, i.e. the component in the output signal that is generated by mechanical crosstalk, the test signal component from the output signal may be isolated and evaluated or monitored. When the test signal component deviates from a specific value that is characteristic for the sensor, an error message is generated.

Such mechanical crosstalk in the sensor 1 may also be simulated without the sensor being asymmetrical. The dual electrode 3a, 3b is controlled in phase opposition by another signal so that the prongs 2a, 2b vibrate under torsion around the X axis, and this vibration is superposed on the prong vibration in the Z direction. The dual electrode 3a, 3b is hence controlled with an additional periodic signal that is superposed on the excitation signal to generate the prong vibration in the Z direction, whereby both signals are in phase. The prongs are excited by the additional signal in that its component in the output signal of the piezoresistive element 5 is phase-shifted 90° from the useful signal generated at an angular rate. A test signal is accordingly modulated onto the signal to excite the prong vibration in the Z direction, the results are added to the excitation signal, and the sensor output signal is evaluated in regard to the response of the system to the test signal and the measured quantity.

When simulated crosstalk is used, the method according to the present invention exploits the fact that the test signal component contained in the output signal is phase-shifted 90° from the useful signal component contained in the output signal. This self-testing method according to the present invention has the advantage that there may be no overlapping with the measuring signal because of the phase selectivity to the angular rate in the frequency range of the test signal. By changing the amplitude of the test signal, the self-test may be performed over the entire measuring range of the sensor while the sensor supplies a measuring signal or angular rate signal.

A different type of self-test may be performed using the tuning fork angular rate sensor shown in FIG. 1 in which an angular rate is simulated by the test signal, i.e., the excitation vibration is modulated with a signal that corresponds to an angular rate. Modulation using the angular rate equivalent signal may be attained by measuring the output signal from monitoring the amplitude of the prongs 2a, 2b vibrating in the Z direction using the piezoresistive element 6 with which the amplitude of the periodic test signal is modulated. The amplitude-modulated signal is then added to the periodic control signal to vibrate the prongs 2a, 2b in the Z direction. Both signals are 90° out of phase from other. In the sensor 1, this results in torque being exerted on the torsion bar 4 which corresponds to an angular rate that changes with the test frequency of the test signal. In this case, a bandpass filter reconstructs the test signal component in the output signal of the piezoresistive element 5. As is the case when simulating the mechanical crosstalk, the test signal component in the output signal is compared with the test signal fed to the sensor via the dual electrode 3a, 3b when the angular rate is simulated. In the sensor output signal, the measured quantity (in this case, the angular rate to be determined) and the response of the system to the test signal are evaluated.

By varying the amplitude of the test signal modulated onto the useful signal and comparing it with the reconstructed test signal component in the output signal, a self-test of the entire sensor may be performed that extends the entire measuring range. For example, at a low amplitude of the torsion vibration generated with the dual electrode 3a, 3b, the sensor may be tested within a measuring range of small angular rates, and the sensor may perform a self-test within a measuring range of relatively high angular rates when the amplitude of the artificially-generated torsion vibration is high. By modulating the amplitude of the signal that generates the torsional vibration of the prongs 2a, 2b via the dual electrode 3a, 3b that is superposed on the excitation vibration of the prongs 2a, 2b in the Z direction, it is possible to continuously cycle through the sensor measuring range.

By varying the test frequency of the test signal modulated onto the useful signal, it is also possible to cycle through the entire dynamic range of the sensor in the self-test. When modulating the signal with an angular-rate-equivalent signal, the frequency of the test signal modulated onto the useful signal, i.e., the test frequency, may be outside of the frequency spectrum of the angular rate to be measured. If the frequency spectrum of the angular rate is not known or if it is not possible to select a test signal that has a different frequency from the angular rate to be measured, mechanical crosstalk may be simulated as described above.

Figure 2:
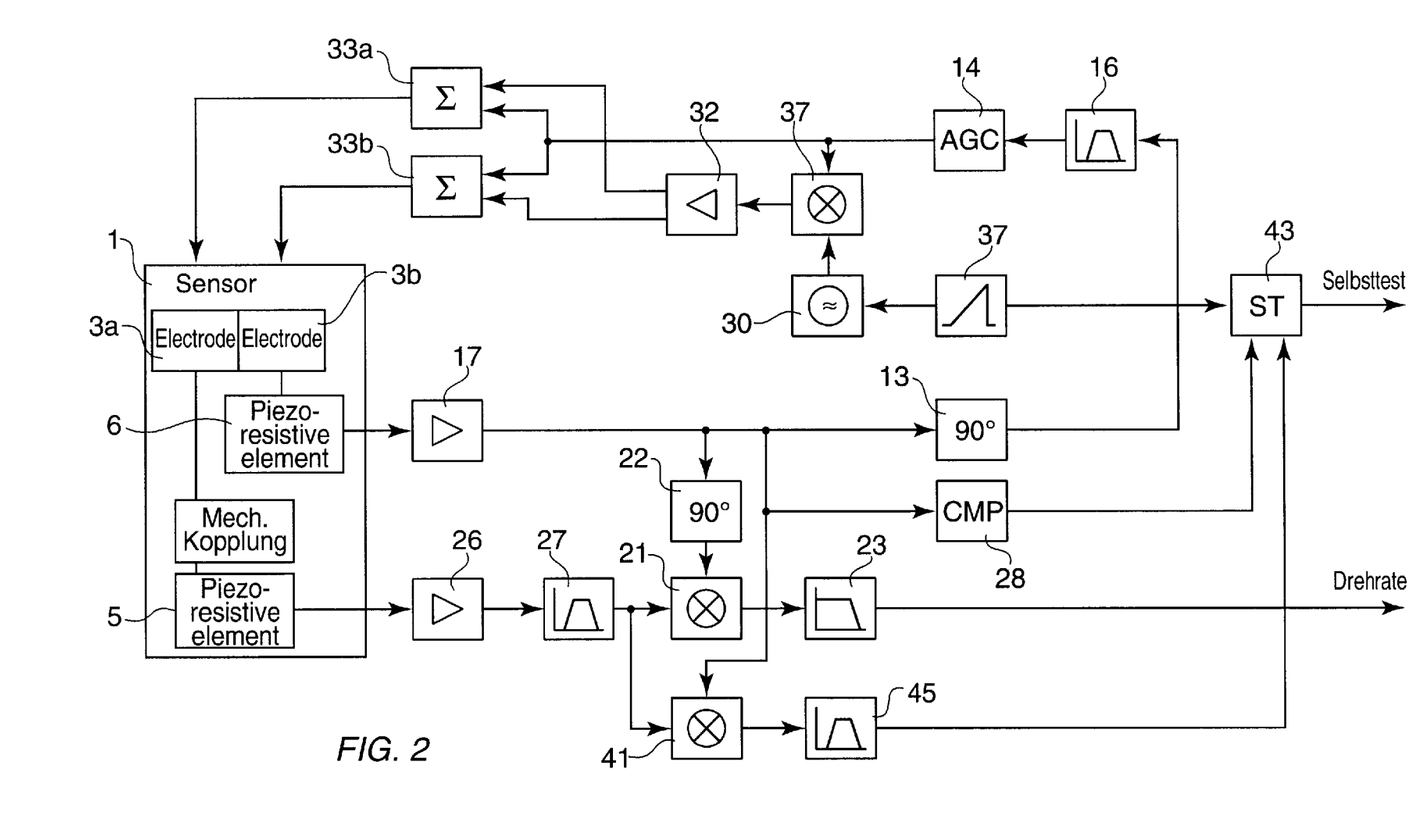
FIG. 2 is a circuit diagram for self-testing by simulating an unbalance.

FIG. 2 illustrates a circuit for a tuning fork angular rate sensor that simulates the unbalance of the sensor for the self-test. The amplitude of the vibration of the prongs 2a, 2b is measured by the piezoresistive element 6 on the top prong 2a and fed via a preamplifier 17 and a 90° phase shifter 13 to the dual electrode 3a, 3b to generate a resonant vibration of the prongs 2a, 2b in the Z direction. An amplitude controller 14 downstream from a bandpass filter 16 controls the amplitude of the excitation vibration where the two prongs 2a, 2b are parallel. The output signal generated by the piezoresistive element 5 on the torsion bar 4 is fed to a multiplier 21 after passing through a preamplifier 26 and a bandpass filter 27. The multiplier filters out the useful signal component, i.e. the component of the measuring signal that is generated by rotating the system on the X axis. This useful signal component is 90° out of phase from the prong vibration in the Z direction. The phase shifter 22 and multiplier 21 accordingly provide the useful signal component from the output signal of the sensor.

A signal generator 30 generates a periodic test signal at frequency $f_{test}$ that is modulated by a multiplier 31 onto the signal to excite the prong vibration in the Z direction. In accordance with an amplifier 32, signals in phase opposition are generated that are added by an adder 33a, 33b to the signals to excite the prong vibration in the Z direction and are fed to the dual electrode 3a, 3b. This arrangement produces a vibration of the prongs 2a, 2b with a constant amplitude in the Z direction, and a torsion vibration of the prongs around the X-axis is superimposed on this vibration. The torsion vibration generated in this manner has the same frequency as the excitation vibration in the Z direction and an amplitude that changes periodically with the test frequency $f_{test}$. The test frequency may also be zero so that the amplitude of the additional torsion vibration remains constant.

The torsional vibration (generated by controlling in phase opposition the dual electrode 3a, 3b) is excited with a signal that is in-phase with the signal to excite the prong vibration in the Z direction. The test signal component contained in the output signal of the piezoresistive element 5 is therefore 90° out of phase with the useful signal component based on the measured angular rate, and it is in-phase with the excitation vibration of the prongs 2a, 2b in the Z direction that is measured with the piezoresistive element 6. For this reason, a multiplier 41 is used to filter out the component from the output signal of the sensor that is in-phase with the prong vibration. This component of the output signal that represents a simulated unbalance of the sensor is fed via a bandpass filter 45 to the self-test arbiter 43 that compares the amplitude of the test signal with the amplitude of the test signal component in the output signal of the sensor. These amplitudes are at a fixed relationship with each other that, e.g., may be determined in a laboratory and represents a set function for a functioning sensor. If the sensor or a part of the electronics is faulty, the amplitude ratio deviates from the setpoint, and an error messages is generated.

The amplitude of the periodic test signal is also periodically changed in a saw-toothed pattern by the element 37. This arrangement yields particularly precise error recognition over the entire measuring range since the self-test amplitude is adapted over the entire measuring range.

Figure 3:
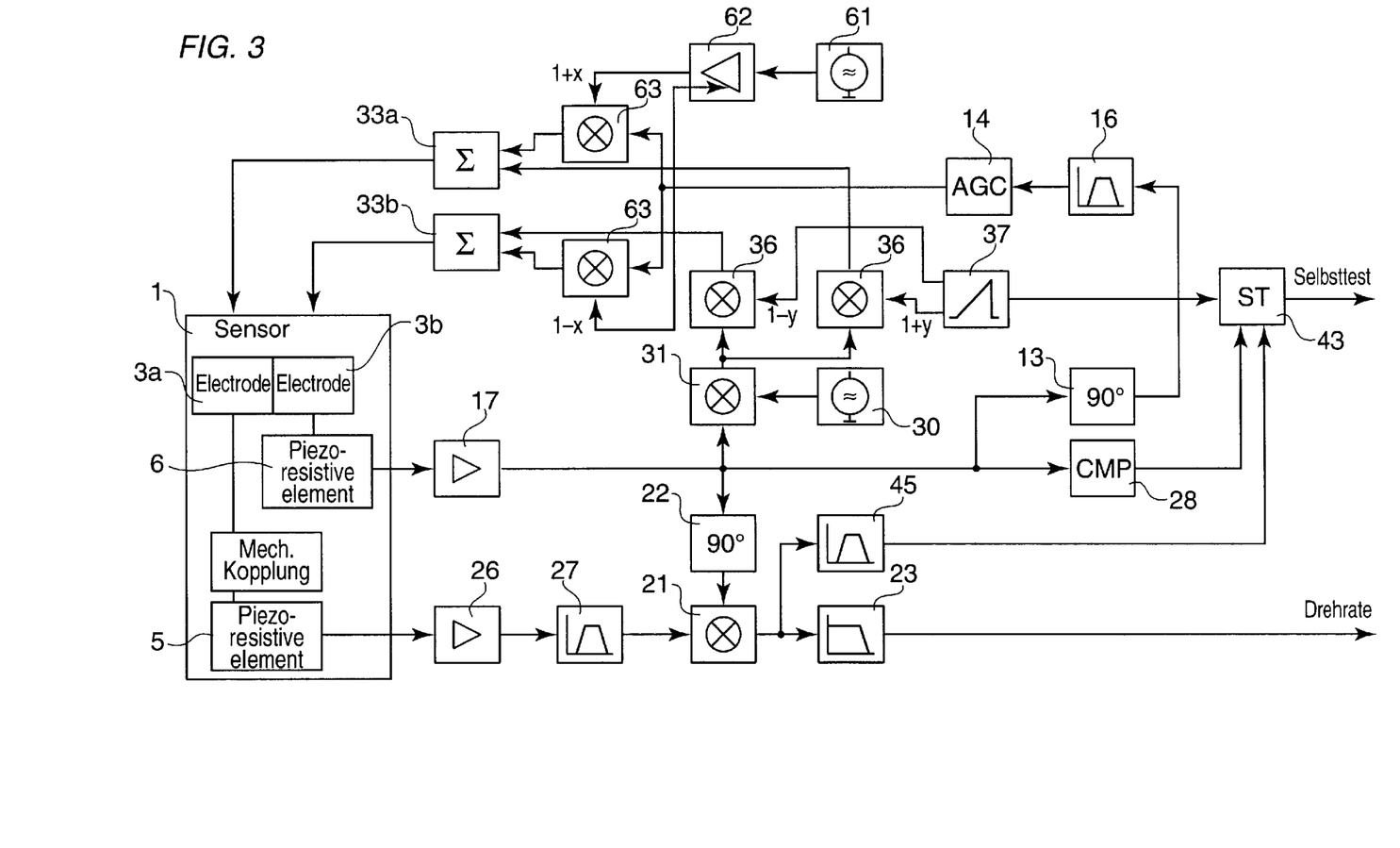
FIG. 3 is a circuit diagram for self-testing by simulating an angular rate.

FIG. 3 illustrates a circuit with which an angular rate is simulated to perform the self-test. Elements with the same function are identified with the same reference numbers as in FIG. 2. The prong vibration is generated by the preamplifier 17, the phase shifter 13, the amplitude controller 14, and the adder 33a, 33b as in the circuit illustrated in FIG. 2. The signal to excite the prong vibration in the Z direction precedes the prong vibration by 90°. The torsion of the torsion bar 4 determined with the piezoresistive element 5 arises when the system is rotated 90° out of phase with the prong amplitude. The component of the output signal shifted 90° from the prong amplitude is filtered out by the phase shifter 22 and the multiplier 21, and yields a measure for the angular rate of the system after passing through the lowpass 23.

The signal generator 30 generates the test signal at frequency $f_{test}$ that is modulated onto the amplitude-monitoring signal measured by the piezoresistive element 6 in accordance with the multiplier or AM modulator 31. In contrast to the circuit shown above in FIG. 2, the non-phase-shifted signal of the prong vibration is modulated with the test signal. Antiphase signals are generated with the other multiplier 36 that are added by the adder 33a, 33b to the amplitude control signal to excite the prong vibration in the Z direction, and are fed to the two electrodes 3a, 3b. This arrangement simulates the effect of an angular rate. The output signal of the sensor is checked for the test signal at frequency $f_{test}$ amplitude-monitoring signal. A component of the output signal is fed through a bandpass filter 45 and is then fed to a self-test arbiter 43. To isolate the test signal component in the output signal from the useful signal component when a simulated angular rate is used, the test frequency $f_{test}$ must be outside of the frequency range of the measured quantity or angular rate.

The second vibrational mode of the sensor, i.e., the amplitude of the artificially-generated torsional vibration of the prongs 2a, 2b is modulated corresponding to the measuring range of the sensor. In accordance with the element 37, the amplitude of the superposed periodic test signal is periodically changed in a saw-toothed pattern to obtain a highly precise self-test for the various measuring ranges. As with the circuit illustrated in FIG. 2, the amplitude of the test signal component is compared with the self-test amplitude to determine flaws in the sensor or downstream electronics.

In addition, unbalance compensation 61 may be provided in sensor 1 that uses an amplifier 62 and multiplier 63 to ensure that any arising error tolerances do not generate additional vibration modes.

The tuning fork angular rate sensor is one example embodiment of the present invention. In general, the present invention may be used for systems in which a measured quantity is to be determined via a resonant structure. There are numerous applications, such as acceleration sensors, pressure sensors or Gimbal angular rate sensors.

Figure 4:
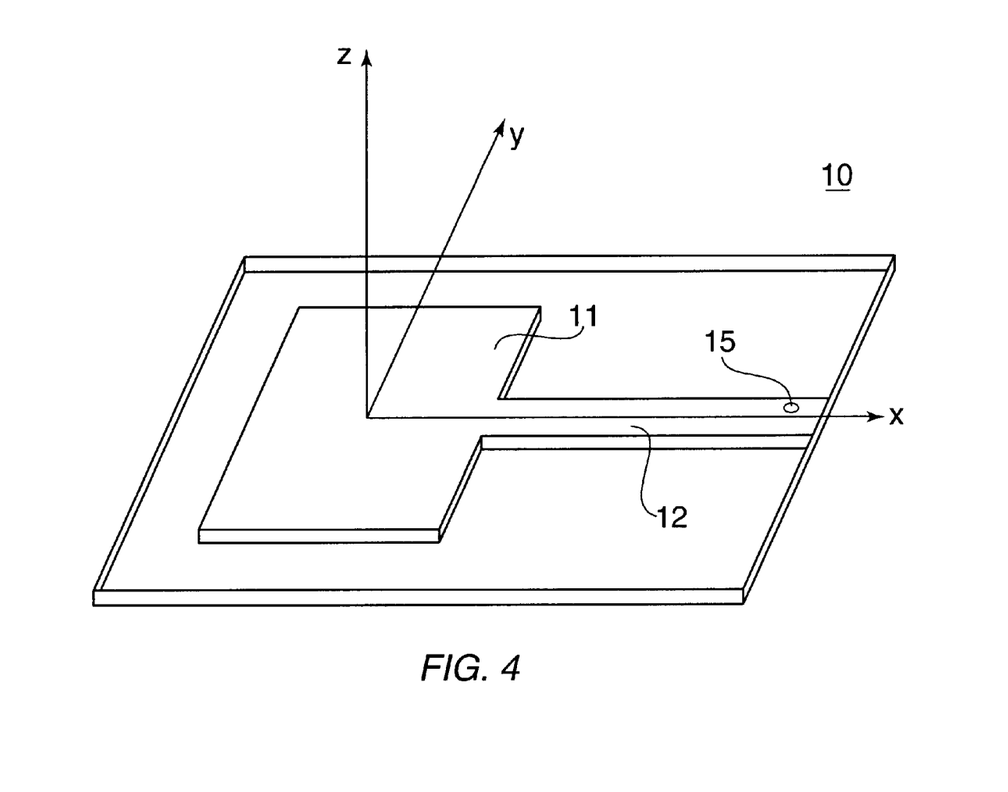
FIG. 4 is a schematic view of an acceleration sensor in another example embodiment of the present invention.

FIG. 4 is a schematic view of an example embodiment of an acceleration sensor 10 in which a mass 11 is attached to a bar 12. To measure the acceleration of the sensor 10 in the X direction, the bar 12 is excited to vibrate in the Z direction. When acceleration occurs in the X direction, the tension of the bar 12 changes so that the frequency of the vibration of the mass in the Z direction also changes and hence represents a measure of acceleration. To perform a sensor self-test, a second vibrational mode is generated in the bar 12 that is superposed on the first vibration mode that serves to determine acceleration. The bar 12 is excited to experience flexural vibration in the Y direction. Both vibration modes of the bar 12 are determined by a piezoresistive element 15. The useful signal component is isolated from the test signal component that causes the second vibration mode in accordance with a frequency and/or phase analysis. The test signal component in the output signal may be monitored while the acceleration sensor is working or registering acceleration.

In another example embodiment of the invention (not shown), the self-testing sensor may be a pressure sensor. In this pressure sensor, a membrane is excited to vibrate to measure pressure acting on the membrane. The membrane tension depends on the pressure and influences the frequency of the resonant vibration. Pressure may accordingly be measured using the resonant membrane. To perform the self-test, the membrane is modulated onto another vibration in accordance with an actor unit, i.e., two vibrational modes of the membrane overlap. The frequency and/or phase of the output signal of the membrane vibration are analyzed to isolate the component from the output signal that is generated by the superposed second vibrational mode of the membrane. A sensor self-test may be performed by comparing the amplitude of the test signal with the amplitude of the test signal component contained in the output signal without interrupting the measuring signal.

The actor elements to generate the vibrations are not limited to electrodes. The excitation may be provided in many ways, especially, e.g., by electrostatic, piezoelectric or thermal elements. Likewise, piezoresistive elements are only one option for determining the various vibrational modes of the sensors. The vibration may be interpreted by electrostatic, capacitive or inductive arrangements. The self-testing sensor or the device and the method for sensor self-testing enable ongoing self-testing without interrupting or impairing the measuring signal, and the test may be performed over the entire measuring and/or dynamic range of the sensor by varying the amplitude and/or frequency of the test signal modulated onto the useful signal.

In general, the present invention may also be implemented, e.g., using an angular rate sensor as follows:

While the angular rate sensor is working, the second mode of the system is directly excited in addition to the first mode by using a signal that is coupled to the excursion of the first mode and is additionally amplitude-modulated with an alternating test signal.

The signal for the system movement in the second mode includes a component that is generated by the test signal in addition to the actual measuring signal based on the Coriolis effect. The measuring component and the test component of the signal for the movement of the system in the second mode may then be 10 isolated from each other by using a frequency and/or phase analysis. Then it is tested whether the relationship between the test signal component in the second mode and the test signal itself fulfill the predetermined conditions. If this is not the case, the sensor generates an error message.

The excitation of the second mode in-phase with the movement of the first mode is recorded, e.g., by sensors on springs. The Coriolis component of the second mode is contrastingly 90° out of phase from the movement of the first mode.

Figure 5:
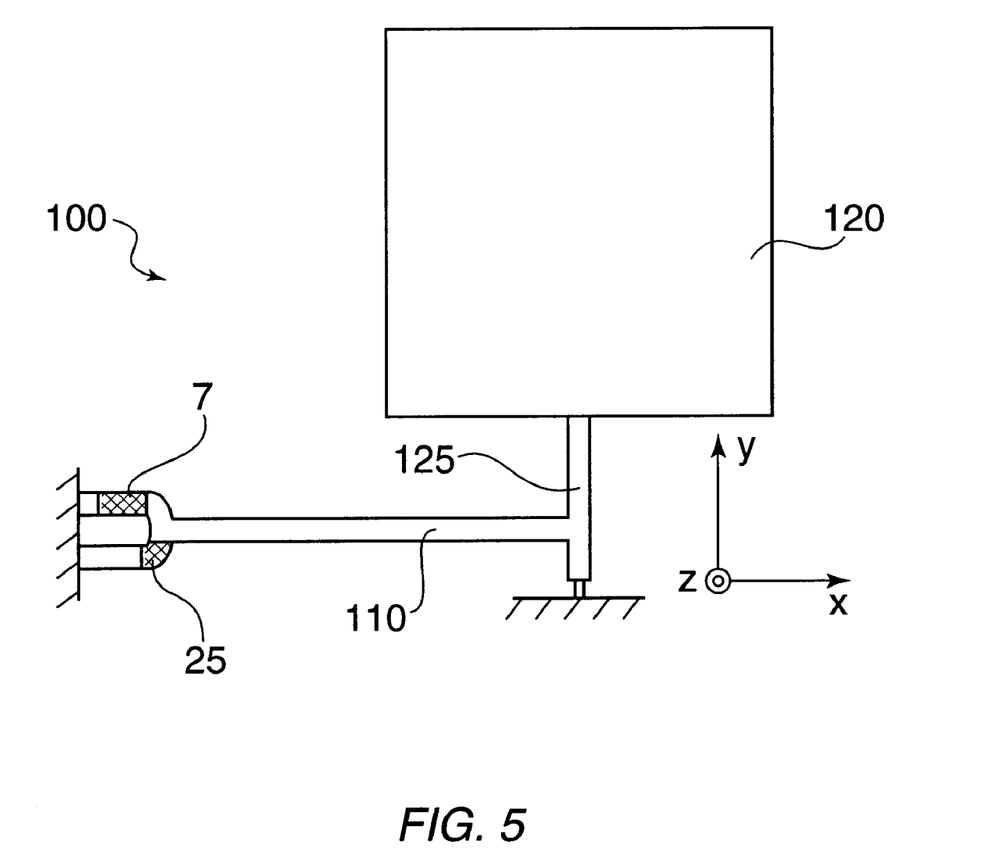
FIG. 5 is a block diagram of a self-testable resonant acceleration sensor according to an example embodiment of the present invention.

FIG. 5 schematically illustrates a section of an acceleration sensor according to the present invention. The acceleration sensor includes an excitation structure 7 that functions as an actor unit, and a resonant structure 100 that includes a resonator or resonator bar 110 and a linked seismic mass 120. The resonator 110 and the resonant mass 120 are connected by another bar 125, i.e., they are not combined into a single element. A detector element 25 provides piezoresistive detection of the basic mode of the resonator bar 110 that is excited thermally to vibrate by the excitation structure 7. In one example embodiment, the basic mode of the resonator bar 110 is 400–500 kHz. When acceleration occurs in the X direction, the mass is displaced due to its inertia, and the resonator 110 experiences tension or pressure. This condition changes the resonance frequency and may be detected as a measuring signal. The described excitation structure 7 is designed so that it may excite the intrinsic modes of the seismic mass 120. The basic mode of the system is the lateral vibration of mass 120 that has a frequency of approximately 16 kHz in the example embodiment. The vibration of this mode corresponds to a periodic, sinusoidal acceleration in the X direction. A permanent self-test is achieved by permanently superposing the excitation signals of the resonator bar and the lateral vibration mode of the mass 120. The signals generated by the detector 25 are subjected to an analysis or Fourier analysis in accordance with suitable evaluation electronics to isolate the test signal (generated by the vibrating mass 120 at a frequency of 16 kHz in an example embodiment) from the measuring signal.

The excitation structure or actor unit 7 may, e.g., be thermal, capacitive or piezoelectric. To save space and expense, only one actor is used to excite the resonator bar 110 and the mass 120. It is, however, also possible to excite the resonator bar 110 and the mass 120 with two separate actor elements. Any combination of the two actor elements using thermal, capacitive and piezoelectric actors is possible.

The detection unit 25 serves to monitor both vibrations or vibration modes and may be capacitive, piezoelectric or piezoresistive. Two separate detection units may also be used to monitor the two vibrations or vibration modes, whereby any combination of capacitive, piezoelectric and piezoresistive detection is possible.

These elements may also be combined to form a single element to excite and detect both signals instead of using two different elements for excitation and signal detection.

Figure 6:
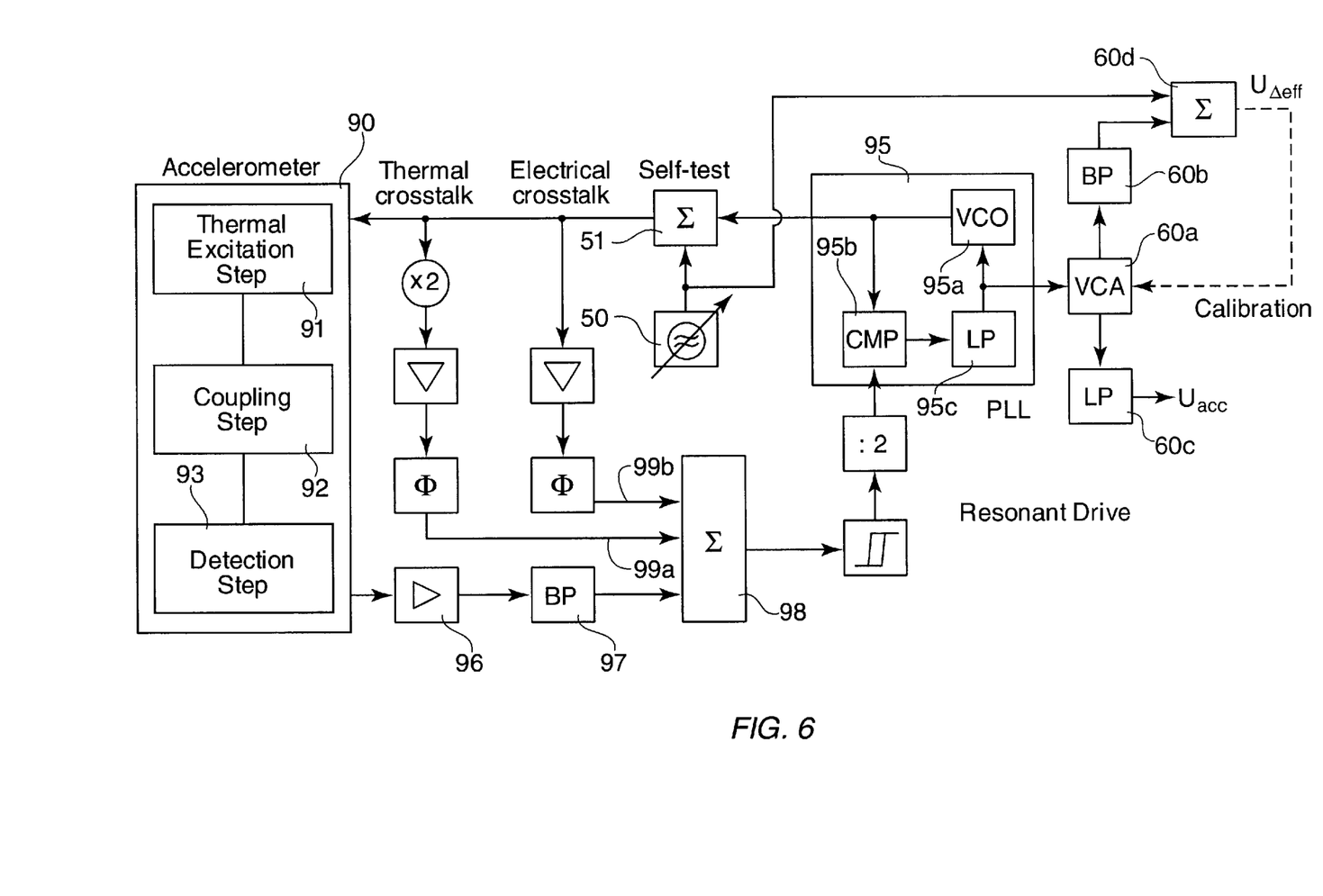
FIG. 6 is a control or evaluation circuit diagram for self-testing the acceleration sensor illustrated in FIG. 5.

FIG. 6 illustrates the basic design of the control and evaluation circuit as a block diagram. The accelerometer 90 includes a thermal excitation step 91 to excite a resonator 110 to vibrate, a coupling step 92 to couple the physical quantity or acceleration to be measured to the resonant system, and a detection step or a piezosensor 93 to detect the vibrations of the resonator 110. A PLL circuit 95 represents the heart of the evaluation circuit. It includes a voltage-controlled oscillator 95a, a phase comparator 95b and a lowpass 95c. The voltage-controlled oscillator generates the excitation signal during operation that is fed to the excitation step 91. The phase comparator 95b compares the phase of the excitation signal with that of the detection signal which is generated by the piezosensor 93. As a result, the phase comparator 95b produces a voltage to track the excitation frequency of the voltage-controlled oscillator 95a so that the resonator bar continuously resonates. This control voltage is also used as measuring signal in the example embodiment.

An adder 51 serves to superpose an additional excitation voltage on the excitation signal that is supplied from the voltage-control oscillator 95a and thereby generate a lateral vibration of the seismic mass 120. This lateral vibration is in the X direction, i.e., in the lengthwise direction of the resonator bar 110 (see FIG. 2). An oscillator 50 generates the additional excitation voltage, whereby the frequency and amplitude of the additional excitation voltage may be adjusted. At the output of the adder 51, a self-test signal is obtained, e.g., at a frequency of approximately 16 kHz in addition to the signal to excite the basic mode of the resonator 110.

The modulated excitation signal is fed to the accelerometer 90 and excites the resonator 110 to vibrate at its intrinsic frequency like the seismic mass 120, and this produces vibrations at a different frequency. The basic mode of the resonator bar 110 has a frequency of approximately 400–500 kHz while the seismic mass vibrates at a frequency of approximately 16 kHz. The vibration of the mass 120 corresponds to an internally applied periodic acceleration.

The output signal from the piezosensor 93 of the accelerometer 90 passes through an amplifier 96 and a bandpass 97 to an adder 98. Other signals 99a, 99b are fed to the adder 98 that serve to eliminate the thermal crosstalk (signal 99a) and electrical crosstalk (signal 99b). After the adder 98, the measuring signal passes through a sine-to-square-wave converter and enters the PLIL circuit 95 described above.

The output signal of the PLL circuit 95 is amplified by a controllable amplifier 60a. Then the signal is subjected to a frequency analysis. In accordance with a lowpass 60c, the signal originating from external acceleration is filtered out. The acceleration signal $U_{acc}$ is accordingly available at the output of the lowpass 60c.

The self-test signal at a frequency of approximately 16 kHz may be isolated using a bandpass 60b. Then the difference between the self-test signal and the test excitation signal is determined in switching element 60d to produce a voltage $U_{\Delta eff}$. If the voltage $U_{\Delta eff}$ exceeds a specific threshold, there is an error. The entire sensor is tested including the electronic circuit. The test hence covers not just the sensor but also the main components of the evaluation electronics.

Since the voltage $U_{Aeff}$ is a measure of sensitivity, it may be used to self-calibrate the sensor. The voltage is controlled to a constant, set value using a controllable amplifier 60a. The circuit is represented in FIG. 6 by the dashed line.

Figure 7:
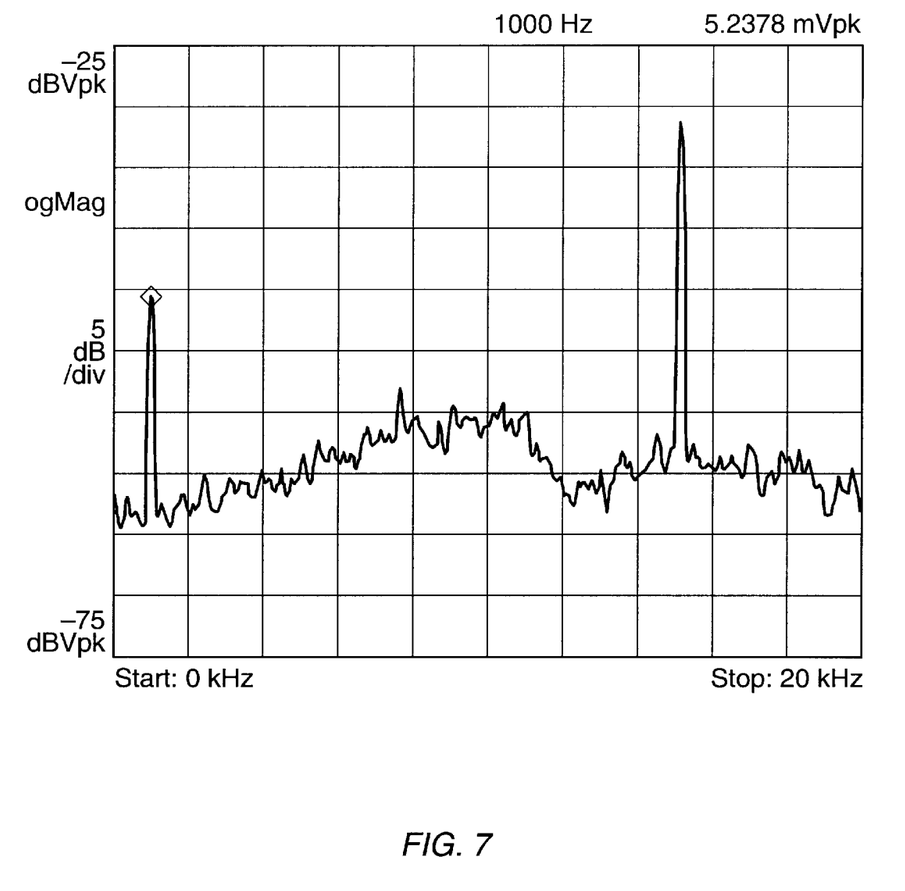
FIG. 7 is a graph illustrating a Fourier analysis of the output signal of the acceleration sensor illustrated in FIG. 5.

FIG. 7 is a graph illustrating a Fourier analysis of the output signal of the above-described evaluation electronics. The basic mode of the resonator bar is thermally excited at a frequency of 400–500 kHz, and the intrinsic modes of the seismic mass 120 are also excited. The basic mode of the system is a lateral vibration of the mass 120 at a frequency of 16 kHz. The vibration of this mode corresponds to a periodic, sinusoidal acceleration in the X direction (see FIG. 5). A permanent self-test was performed by permanently superposing the excitation signals of the resonator bar 110 and the lateral vibration mode of the mass 120. Using a vibrator, a sinusoidal acceleration of 1 kHz was generated in the X direction while the sensor was also operated in self-test mode. The Fourier analysis of the output signal illustrated in FIG. 7 shows the signal of external acceleration at 1 kHz, and the signal of induced acceleration or the self-test at approximately 16 kHz.

When correspondingly modified, the self-testing acceleration sensor may can also be used to measure other quantities that exert force on the mass 120. The acceleration sensor functions according to a resonant readout principal, and a permanent self-test may be performed during measurement. A test acceleration is applied using a continuous test signal, and the associated acceleration signal is accordingly permanently available at the output.

The present invention provides sensors that test themselves without interrupting the actual measurement. Expensive additional components are not necessary, so that the self-testing sensor may be manufactured with a small and economic design.

What is claimed is:

1. A sensor, comprising:
   a resonant structure configured to detect a measured quantity in accordance with a first periodic vibration of the resonant structure;
   a first arrangement configured to generate an output signal in accordance with the measured quantity;
   a second arrangement configured to at least one of determine and isolate a test signal component from the output signal, an adjustable test signal being generated by a second periodic vibration of the resonant structure superposed on the first periodic vibration;
   an actuation unit configured to excite the resonant structure to the first periodic vibration; and
   a third arrangement configured to excite the resonant structure to the second periodic vibration that is superposed on the first periodic vibration.

2. The sensor according to claim 1, further comprising a device configured to modulate the test signal on a signal exciting the resonant structure.

3. A sensor, comprising:
   a resonant structure configured to detect a measured quantity in accordance with a first periodic vibration of the resonant structure;
   a first arrangement configured to generate an output signal in accordance with the measured quantity;
   a second arrangement configured to at least one of determine and isolate a test signal component from the output signal, the test signal being generated by a second periodic vibration of the resonant structure superposed on the first periodic vibration;
   an actuation unit configured to excite the resonant structure to the first periodic vibration; and
   a third arrangement configured to excite the resonant structure to the second periodic vibration that is superposed on the first periodic vibration;
   wherein the third arrangement includes a mechanical unbalance of the resonant structure.

4. The sensor according to claim 1, wherein the second arrangement is configured to isolate the test signal component and includes an analyzer configured to analyze at least one of a frequency and a phase of the output signal.

5. The sensor according to claim 1, further comprising a fourth arrangement configured to periodically change at least one of an amplitude and a frequency of the test signal.

6. The sensor according to claim 1, wherein the sensor includes one of an angular rate sensor, an acceleration sensor and a pressure sensor.

7. The sensor according to claim 1, wherein the resonant structure includes:
   a resonator; and
   a linked resonant mass configured to change a resonance frequency of the resonator when displaced;
   wherein the mass is vibratable to generate the test signal component while performing a measurement.

8. The sensor according to claim 1, further comprising a calibration device configured to calibrate the sensor in accordance with the test signal.

9. The sensor according to claim 7, wherein the actuation unit is configured to cause the resonator and linked resonant mass to vibrate in different modes and wherein the vibrating linked resonant mass periodically changes the resonance frequency of the resonator to generate the test signal.

10. A device for self-testing a sensor, the sensor determining a measured quantity using a resonant structure and generating a periodic output signal in accordance with the measured quantity, comprising:
    an isolation device configured to isolate a test signal component that is superposed on a useful signal component from the periodic output signal of the sensor;
    a comparator device configured to compare the test signal component with one of a predefined value and an adjustable test signal sent to the sensor;
    an actuation unit configured to excite the resonant structure to a first periodic vibration, the sensor determining the measured quantity in accordance with the first periodic vibration; and
    a first arrangement configured to excite the resonant structure to a second periodic vibration that is superposed on the first periodic vibration.

11. The device according to claim 10, further comprising a modulator device configured to modulate the test signal component onto the useful signal component.

12. A device for self-testing a sensor, the sensor determining a measured quantity using a resonant structure and generating a periodic output signal in accordance with the measured quantity, comprising:
    an isolation device configured to isolate a test signal component that is superposed on a useful signal component from the periodic output signal of the sensor;
    a comparator device configured to compare the test signal component with one of a predefined value and a test signal sent to the sensor;

an actuation unit configured to excite the resonant structure to a first periodic vibration, the sensor determining the measured quantity in accordance with the first periodic vibration; and a first arrangement configured to excite the resonant structure to a second periodic vibration that is superposed on the first periodic vibration;

wherein the first arrangement includes a mechanical unbalance on the resonant structure.

13. The device according to claim 10, wherein the isolation device includes an analyzer device configured to analyze at least one of a frequency and a phase of the periodic output signal.

14. The device according to claim 10, further comprising a second arrangement configured to periodically change at least one of an amplitude and a frequency of the test signal.

15. A method for self-testing a sensor having a resonant structure, comprising the steps of:

exciting the resonant structure by an actuation unit to generate a first periodic vibration and a second periodic vibration including an adjustable test signal;

superposing the second periodic vibration onto the first periodic vibration of the structure;

detecting an output signal, the output signal including information relating to a measured quantity coupled to the resonant structure; and monitoring a test signal component of the output signal, the test signal component being generated by the second periodic vibration of the structure;

wherein the second periodic vibration is superposed onto the first periodic vibration to permit simultaneous detection of the measured quantity and monitoring of the test signal component.

16. The method according to claim 15, further comprising the step of modulating an excitation signal for the structure in accordance with the test signal.

17. A method for self-testing a sensor having a resonant structure, comprising the steps of:

exciting the resonant structure by an actuation unit to generate a first periodic vibration and a second periodic vibration;

superposing the second periodic vibration onto the first periodic vibration of the structure;

detecting an output signal, the output signal including information relating to a measured quantity coupled to the resonant structure; and monitoring a test signal component of the output signal, the test signal component being generated by the second periodic vibration of the structure;

wherein the second periodic vibration is superposed onto the first periodic vibration to permit simultaneous detection of the measured quantity and monitoring of the test signal component; and wherein the second periodic vibration of the structure is excited by one of a mechanical coupling and a mechanical crosstalk of the sensor.

18. The method according to claim 15, further comprising the step of subjecting the output signal to at least one of a frequency analysis and a phase analysis.

19. The method according to claim 15, further comprising the step of varying at least one of a frequency and an amplitude of the test signal while the sensor is being used for measurement.

20. The method according to claim 15, further comprising the step of calibrating the sensor in accordance with the test signal component.

21. The method according to claim 15, wherein the resonance structure is excited in the exciting step to vibrate with at least two frequencies, a first one of the at least two frequencies corresponding to the measured quantity, and a second one of the at least two frequencies corresponding to the test signal.

22. An acceleration sensor, comprising:

a resonant structure, including:
a resonator; and
a resonant mass coupled to the resonator, a resonance frequency of the resonator changing in accordance with a displacement of the resonant mass;

an actuation unit configured to excite the resonator;

a detector configured to generate an output signal in accordance with the resonance frequency of the resonator;

a control unit configured to generate an excitation signal, the excitation signal including at least two frequencies to simultaneously excite the resonator and the resonant mass to vibrate in different modes; and an evaluation unit configured to separate a vibration mode of the resonant mass as an adjustable test signal component from the output signal.

23. The acceleration sensor according to claim 22, further comprising a self-testing device, the self-testing device including:

an isolation device configured to isolate the test signal component that is superposed on a useful signal component from the output signal; and a comparator device configured to compare the test signal component with one of a predefined value and a test signal sent to the sensor;

wherein the actuation unit is configured to excite the resonant structure to a first periodic vibration mode, the sensor determining a measured quantity in accordance with the first periodic vibration mode; and wherein the self-testing device further includes a first arrangement configured to excite the resonant structure to a second vibration mode that is superposed on the first periodic vibration mode.

24. The acceleration sensor according to claim 23, wherein the self-testing device further includes a modulator device configured to modulate the test signal component onto the useful signal component.

25. An acceleration sensor, comprising:

a resonant structure, including:
a resonator; and
a resonant mass coupled to the resonator, a resonance frequency of the resonator changing in accordance with a displacement of the resonant mass;

an actuation unit configured to excite the resonator;

a detector configured to generate an output signal in accordance with the resonance frequency of the resonator;

a control unit configured to generate an excitation signal, the excitation signal including at least two frequencies to simultaneously excite the resonator and the resonant mass to vibrate in different modes; and an evaluation unit configured to separate the vibration mode of the resonant mass as a test signal from the output signal;

a self-testing device, the self-testing device including:

an isolation device configured to isolate the test signal component that is superposed on a useful signal component from the output signal; and a comparator device configured to compare the test signal component with one of a predefined value and a test signal sent to the sensor;

wherein the actuation unit is configured to excite the resonant structure to a first periodic vibration mode, the sensor determining the measured quantity in accordance with the first periodic vibration mode;

wherein the self-testing device further includes a first arrangement configured to excite the resonant structure to a second vibration mode that is superposed on the first periodic vibration mode; and wherein the first arrangement includes a mechanical unbalance on the resonant structure.

26. The acceleration sensor according to claim 23, wherein the isolation device includes an analyzer device configured to analyze at least one of a frequency and a phase of the output signal.

27. The acceleration sensor according to claim 23, wherein the self-testing device further includes a second arrangement configured to periodically change at least one of an amplitude and a frequency of the test signal.

* * * * *